United States Patent
Marone et al.

(10) Patent No.: US 10,435,140 B2
(45) Date of Patent: Oct. 8, 2019

(54) SYSTEM AND METHOD FOR ELECTRONIC PROPELLER BLADE ANGLE POSITION FEEDBACK WITH ANGLED PAIRS OF TEETH

(71) Applicant: Pratt & Whitney Canada Corp., Longueuil (CA)

(72) Inventors: Joseph Ernesto Marone, Montreal (CA); James Robert Jarvo, St. Bruno (CA); Ella Yakobov, Montreal (CA); Mark Iacobacci, LaSalle (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 564 days.

(21) Appl. No.: 15/239,779

(22) Filed: Aug. 17, 2016

(65) Prior Publication Data
US 2018/0050789 A1   Feb. 22, 2018

(51) Int. Cl.
*B64C 11/30* (2006.01)
*G01D 5/247* (2006.01)
*G01D 5/14* (2006.01)
*B63H 3/00* (2006.01)

(52) U.S. Cl.
CPC ............ *B64C 11/301* (2013.01); *G01D 5/247* (2013.01); *B63H 2003/006* (2013.01); *B64C 11/30* (2013.01); *G01D 5/145* (2013.01)

(58) Field of Classification Search
None
See application file for complete search history.

(56) References Cited

U.S. PATENT DOCUMENTS

| | | |
|---|---|---|
| 4,948,337 A | 8/1990 | Martin et al. |
| 5,209,640 A | 5/1993 | Moriya |
| 5,284,418 A | 2/1994 | Moriya |
| 5,299,911 A | 4/1994 | Moriya |

(Continued)

FOREIGN PATENT DOCUMENTS

| | | | | |
|---|---|---|---|---|
| DE | 10306641 A1 | * | 8/2004 | ........... F16D 25/083 |
| EP | 0353076 | | 1/1990 | |

(Continued)

OTHER PUBLICATIONS

Jones et al., Preliminary Design of Sliding Mode Controller for Angular Positional Tracking of an Aircraft, 2009, IEEE, p. 483-488.

*Primary Examiner* — John C Kuan
(74) *Attorney, Agent, or Firm* — Norton Rose Fulbright Canada LLP

(57) ABSTRACT

A system and method for blade angle position feedback. The system comprises an feedback device and a sensor mounted adjacent the feedback device and configured for detecting a passage of position markers on the feedback device during propeller rotation. The position markers are spaced apart from one another around the circumference of the feedback device and are oriented at an angle to one another and to a longitudinal axis. The feedback device and sensor are configured for relative axial displacement. A detection unit is connected to the sensor for receiving the sensor signal therefrom, determining on the basis of the sensor signal a time interval elapsed between the passage of successive position markers, and computing from the time interval blade angle position.

18 Claims, 14 Drawing Sheets

(56) References Cited

U.S. PATENT DOCUMENTS

| | | | |
|---|---|---|---|
| 5,865,599 A | 2/1999 | Pruden et al. | |
| 5,997,250 A | 12/1999 | Carter et al. | |
| 6,004,098 A | 12/1999 | Chevallier et al. | |
| 6,224,021 B1 | 5/2001 | Tanaka | |
| 7,281,482 B1 | 10/2007 | Beauchamp et al. | |
| 7,545,518 B2 * | 6/2009 | Heyworth | G01D 5/3473 356/620 |
| 8,186,629 B2 | 5/2012 | Queiras et al. | |
| 8,262,352 B2 | 9/2012 | Gainford et al. | |
| 8,465,257 B1 | 6/2013 | Noble et al. | |
| 8,549,833 B2 | 10/2013 | Hyde et al. | |
| 8,689,538 B2 | 4/2014 | Sankrithi et al. | |
| 9,216,820 B2 | 12/2015 | Eglin | |
| 9,272,778 B2 | 3/2016 | Eglin | |
| 9,821,901 B2 * | 11/2017 | Duke | G01P 3/488 |
| 2004/0018914 A1 | 1/2004 | Stolfus | |
| 2013/0094966 A1 * | 4/2013 | Holt | B64C 11/30 416/147 |
| 2015/0139798 A1 | 5/2015 | Duke et al. | |

FOREIGN PATENT DOCUMENTS

| | | |
|---|---|---|
| EP | 0864490 | 9/1998 |
| EP | 2876046 | 5/2015 |
| GB | 1303994 | 1/1973 |
| GB | 21818246 | 4/1987 |
| GB | 2346701 | 8/2000 |
| GB | 2465575 | 5/2010 |

\* cited by examiner

SYSTEM AND METHOD FOR ELECTRONIC PROPELLER BLADE ANGLE POSITION FEEDBACK WITH ANGLED PAIRS OF TEETH

TECHNICAL FIELD

The application relates generally to propeller feedback systems for gas turbine engines and, more particularly, to systems and methods for blade angle position feedback.

BACKGROUND

On reversing propeller systems, it is desirable to accurately measure the propeller blade (or beta) angle. In this manner, it becomes possible to ensure that the blade angle is controlled according to the engine power set-point requested in reverse operation. Accurate measurement of the blade angle also ensures that the propeller is not inadvertently commanded to transition into low or reverse beta angles, which would cause a potentially serious condition for the aircraft.

Current turboprop propeller feedback systems typically use a mechanical cam and cables to provide a variable hydraulic lockout mechanism to prevent the propeller from transitioning into a low or reverse beta position. However, a drawback of such systems is that they do not interface well with digital control systems.

There is therefore a need for an improved propeller feedback system.

SUMMARY

There is described herein a system and method for blade angle position feedback. The system comprises an annular member operatively connected to rotate with a propeller, a sensor mounted adjacent the annular member and configured for detecting a passage of position markers as the annular member is rotated and axially displaced and for generating a sensor signal accordingly, the annular member and sensor configured for relative axial displacement between a first relative axial position and a second relative axial position respectively corresponding to a first and a second mode of operation, and a detection unit connected to the sensor for receiving the sensor signal therefrom, determining on the basis of the sensor signal a time interval elapsed between the passage of successive position markers, and computing from the time interval blade angle position.

A blade angle position feedback system for an aircraft propeller is described, the propeller rotatable about a longitudinal axis and comprising a plurality of blades each rotatable through a range of blade angles. The system comprises: a feedback device comprising at least one pair of position markers spaced from one another around a circumference of the feedback device and oriented at an angle relative to one another and relative to the longitudinal axis; at least one sensor mounted adjacent the feedback device, the at least one sensor configured for successively detecting passage of the position markers and generating a sensor signal indicative of passage of the position markers, the feedback device and the at least one sensor configured for relative axial displacement between a first relative axial position and a second relative axial position, the first axial position corresponding to a first mode of operation and the second axial position corresponding to a second mode of operation, one of the feedback device and the at least one sensor rotationally coupled to the propeller for rotation relative to the other of the feedback device and the at least one sensor; and a detection unit connected to the at least one sensor for receiving the sensor signal therefrom, determining on the basis of the sensor signal a time interval elapsed between passage of the position markers, and computing from the time interval a blade angle position for the plurality of blades.

An aircraft propeller system is described, comprising: a propeller rotatable about a longitudinal axis and having a plurality of blades each rotatable through a range of blade angles; a feedback device comprising at least one pair of position markers spaced from one another around a circumference of the feedback device and oriented at an angle to one another and to the longitudinal axis; a sensor adjacent the feedback device and configured for detecting the position markers passing the sensor and for generating a sensor signal indicative of passage of the position markers, the feedback device and sensor movably mounted with respect to one another, one of the feedback device and sensor mounted for rotation with the propeller and the other fixedly mounted; and a detection unit connected to the sensor and configured for determining on the basis of the sensor signal a time interval between passage of the position markers and computing a blade angle position based on the time interval.

A method for blade angle position feedback for an aircraft propeller is described, the propeller rotatable about a longitudinal axis and comprising a plurality of blades each rotatable through a range of blade angles. The method comprises: receiving a sensor signal from at least one sensor mounted adjacent to a feedback device, one of the at least one sensor and the feedback device operatively connected to rotate with the propeller, the feedback device comprising at least one pair position markers spaced apart around a circumference thereof and oriented at an angle to one another and to the longitudinal axis, the at least one sensor configured for successively detecting a passage of each one of the at least one pair of position markers and for generating a sensor signal indicative of passage of the position markers, the feedback device and the at least one sensor configured for relative axial displacement; determining on the basis of the sensor signal a time interval elapsed between the passage of a first position marker and a second position marker of the at least one pair; and computing from the time interval a blade angle position for the plurality of blades.

BRIEF DESCRIPTION OF DRAWINGS

Reference is now made to the accompanying figures in which.

DETAILED DESCRIPTION

Figure 1:
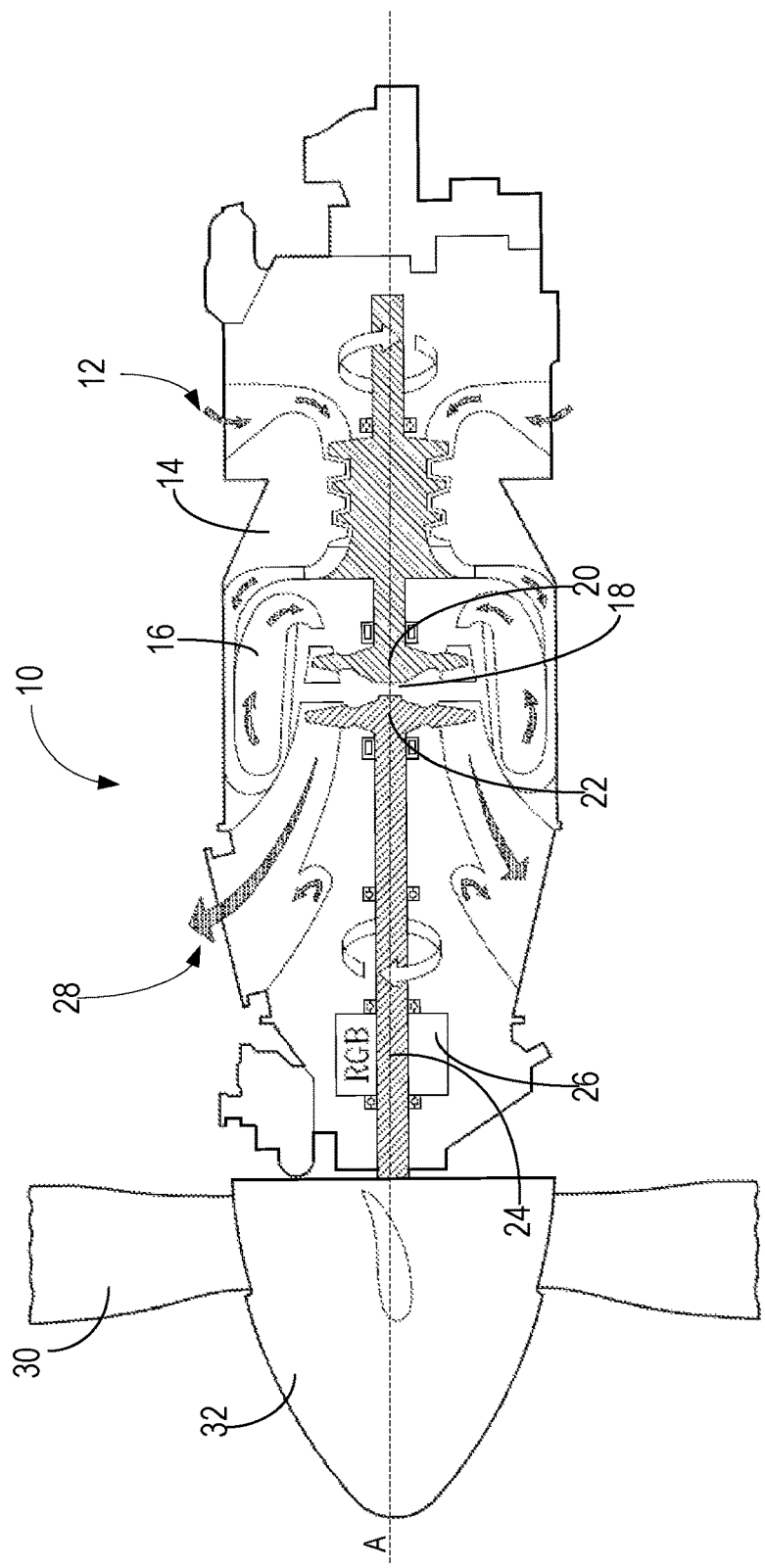
FIG. 1 is a schematic cross-sectional view of a gas turbine engine.

FIG. 1 illustrates a gas turbine engine 10, of a type typically provided for use in subsonic flight, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatingly drives a rotor shaft 24 about a propeller shaft axis A through a reduction gearbox 26. Hot gases may then be evacuated through exhaust stubs 28. The gas generator (not shown) of the engine 10 illustratively comprises the compressor section 14, the combustor 16, and the turbine section 18. A rotor 30, in the form of a propeller through which ambient air is propelled, is hosted in a propeller hub 32. Rotor 30 may, for example, comprise a propeller of a fixed-wing aircraft or a main (or tail) rotor of a rotary-wing aircraft such as a helicopter. The rotor 30 may comprise a plurality of circumferentially-arranged blades (not shown) connected to a hub (not shown) by any suitable means and extending radially therefrom. The blades are also each rotatable about their own radial axes through a plurality of blade angles, which can be changed to achieve modes of operation, such as feather, full reverse, and forward thrust.

Figure 2:
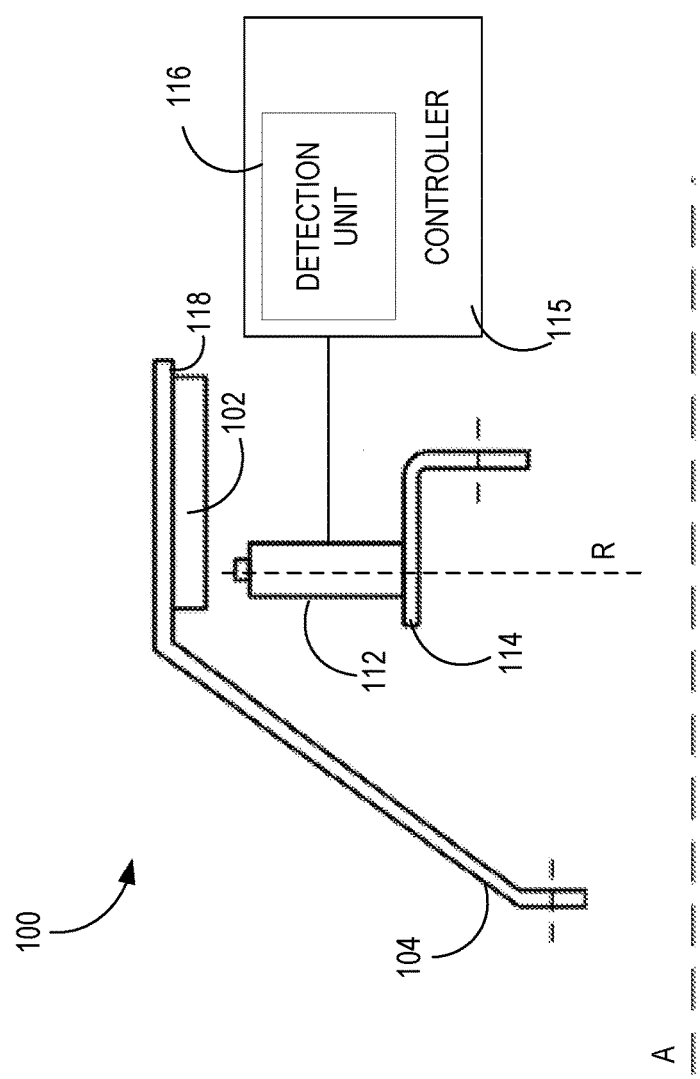
FIG. 2 is a schematic diagram of a system for electronic beta feedback detection, in accordance with an illustrative embodiment.

Referring to FIG. 2, an electronic beta feedback system 100 will now be described. The system 100 provides for accurate detection and measurement of propeller blade angle on propeller systems, such as the engine 10 of FIG. 1. The system 100 may interface to existing mechanical interfaces of typical propeller systems to provide a variable mark/space digital detection for electronic determination of the propeller blade angle.

Figure 3A:
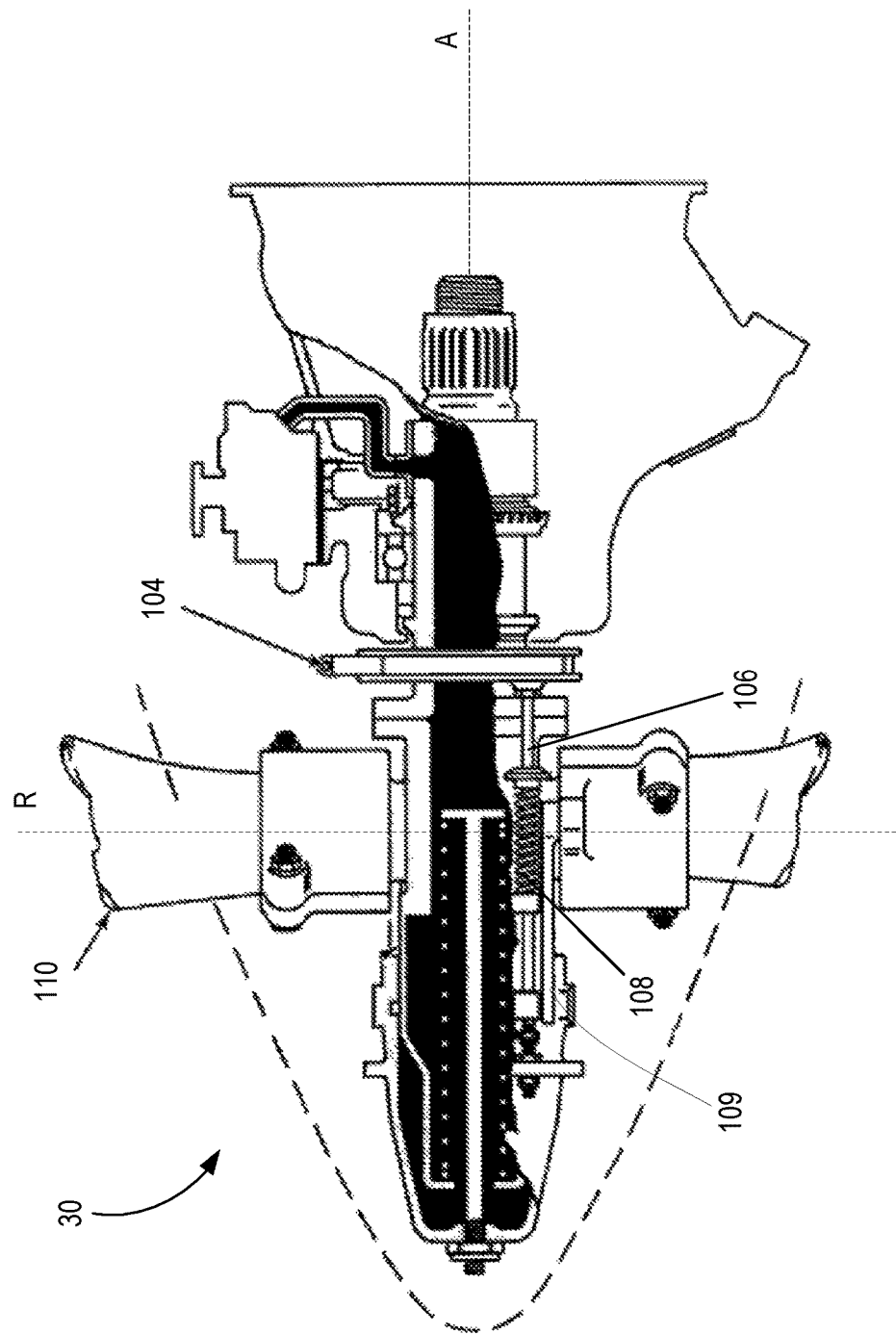
FIG. 3A is a schematic diagram of the propeller of FIG. 1 showing the feedback ring of FIG. 2, in accordance with an illustrative embodiment.

The system 100 illustratively comprises a plurality of position markers 102 provided on an annular member 104 (referred to herein as a propeller beta feedback ring) carried on the propeller 30. As can be seen in FIG. 3A, the beta feedback ring 104 is supported for rotation with the propeller 30, which rotates about a longitudinal axis A. The beta feedback ring 104 is also supported for axial sliding movement along the axis A, e.g. by support members, such as a series of circumferentially spaced beta feedback rods 106 that extend along the axis A. A compression spring 108 surrounds an end portion of each rod 106.

As depicted in FIG. 3A, the propeller 30 comprises a plurality of angularly arranged blades 110 each rotatable about a radially-extending axis R through a range of adjustable blade angles, the blade angle being the angle between the chord line (i.e. a line drawn between the leading and trailing edges of the blade) of the propeller blade section and a plane perpendicular to the axis of propeller rotation. The propeller 30 may be a reversing propeller 30 having a plurality of modes of operation, such as feather, full reverse, and forward thrust. In some modes of operations, such as feather, the blade angle is positive. The propeller 30 may be operated in a reverse mode where the blade angle is negative.

Figure 3B:
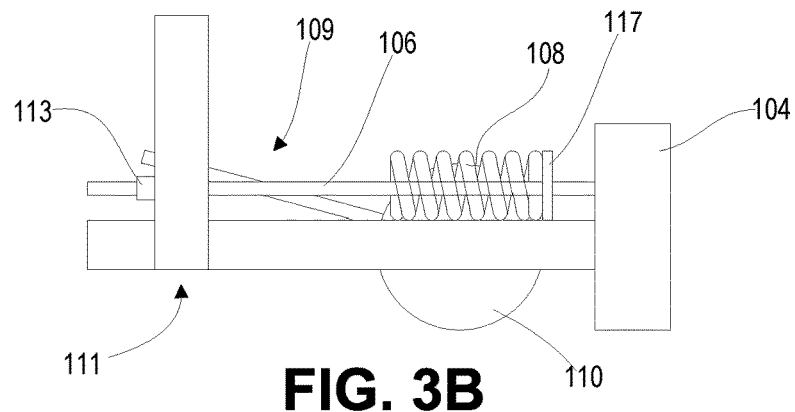
FIGS. 3B-3D are schematic diagrams showing adjustment of propeller blade angle.
Figure 3C:
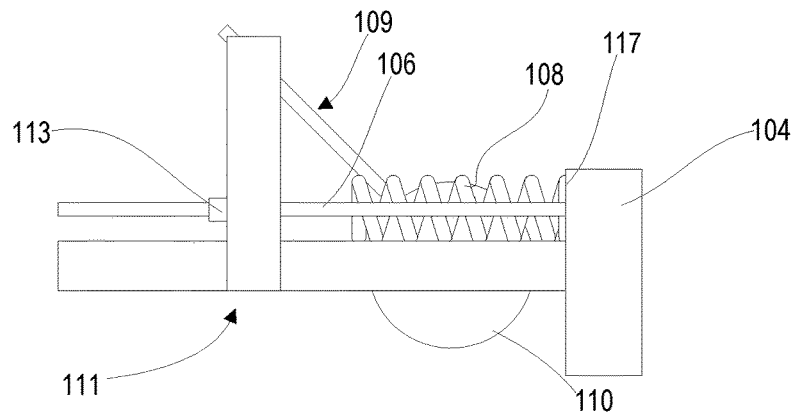
Figure 3D:
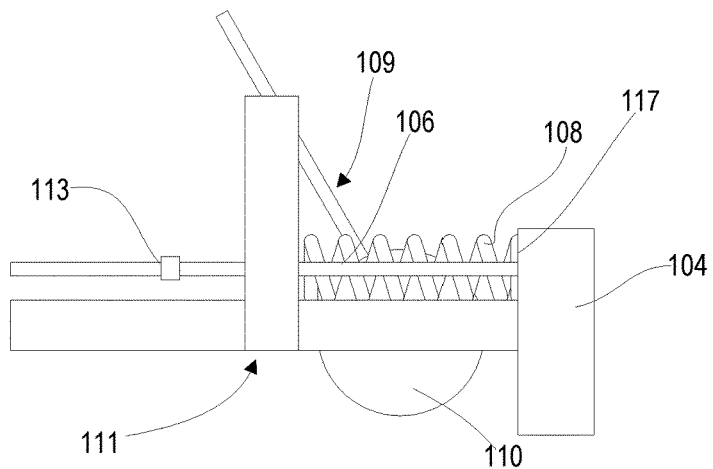

In an example, actuators 109 engage with a piston assembly 111 for adjusting the beta angle of the blades. Specifically, piston assembly 111 moves back and forth along the longitudinal axis and cause rotation of blades 110 by sliding engagement with actuators 109. In the depicted embodiment, forward motion of piston assembly 111 reduces the beta angle of blades 110 and rearward motion increases the beta angle. However, in other embodiments, this may be reversed. Piston assembly 111 also engages rods 106 as it adjusts the beta angle. During a portion of the forward motion of piston assembly 111, it bears against a stop 113 mounted to rod 106, pulling rod 106 and feedback ring 104 forwardly and compressing spring 108 as shown in FIG. 3B. As piston assembly 111 moves rearwardly, spring 108 urges rod 106 and feedback wheel 104 rearwardly as shown in FIG. 3C. In the depicted embodiment, feedback wheel 104 reaches its maximally-rearward position before piston assembly 111 reaches its maximally-rearward position. After feedback ring 104 reaches is maximally-rearward position, piston assembly 111 moves out of contact with stop 103 as shown in FIG. 3D, after which further rearward movement of piston assembly 111 does not cause movement of feedback ring 104.

Other suitable configurations for adjusting beta angle and causing corresponding longitudinal movement of feedback wheel 104 will be apparent to skilled persons.

Referring back to FIG. 2, the feedback ring 104 is illustratively used to provide blade (or beta) angle position feedback. During rotation of the propeller (reference 30 in FIG. 3), the plurality of position markers 102 rotate with the feedback ring 104 about the longitudinal axis A and their passage is detected by at least one sensor 112 provided in a fixed relationship relative to the rotating propeller components. The sensor 112 may be any sensor (e.g. a speed transducer) configured to continuously detect passage of the position markers 102 during rotation of the propeller 30. In one embodiment, the sensor 112 is an electrically robust and environmentally sealed non-contact sensor suited for harsh environments and offering superior reliability. The sensor 112 may be any suitable inductive sensor having a varying reluctance or a Hall effect. In one embodiment, the sensor 112 is implemented as a transducer comprising a coil wound around a permanent magnet (not shown). The position markers 102A, 102B, 102C may then be made of a magnetically conductive material, e.g. a ferrous metal, to enable the sensor 112 to detect the passage thereof.

The sensor 112 is illustratively mounted to a flange 114 of the propeller housing (not shown) so as to be positioned adjacent the plurality of position markers 102. In particular, the sensor 112 is illustratively secured to the propeller 30 so as to extend away from the flange 114 (and towards the position markers 102) along a direction C substantially transverse to the axis of rotation A. In one embodiment, a single sensor 112 is mounted in close proximity to the beta feedback ring 104 and the position markers 102. In another embodiment, in order to provide loss of probe protection, two (2) sensors 112 may be mounted in a diametrically opposite relationship relative to the position markers 102, which illustratively extend away from the feedback ring 104 and towards the sensor(s) 112. In such embodiments, each sensor 112 may be independently operable as described herein. Therefore, each additional sensor 112 may provide redundancy and protect against malfunctions of other sensors 112. In yet another embodiment, several position markers 102 may be spaced equiangularly about the perimeter of the feedback ring 104. Other embodiments may apply.

Figure 10:
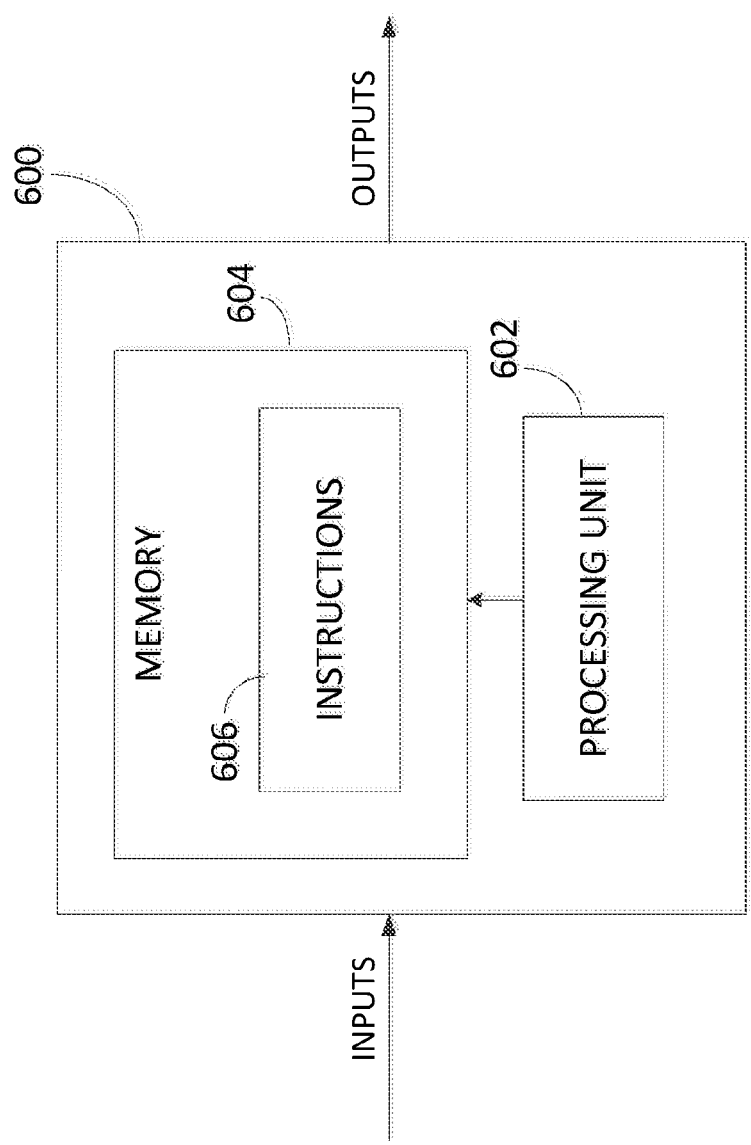
FIG. 10 is a schematic diagram of a controller.

A detection unit 116 is illustratively electrically connected to the sensor(s) 112 and configured to receive output signal(s) therefrom, the output signal(s) generated upon the sensor(s) 112 detecting the passage of a given position marker 102 adjacent thereto, as will be discussed further below. The detection unit 116 is illustratively part of the Engine Electronic Control 115 (EEC; FIG. 10) and is configured to provide, on the basis of the signal(s) received from the sensor(s) 112, a blade angle position feedback for the propeller (reference 30 in FIG. 3), as will be discussed further below. For this purpose, the detection unit 116 may comprise one or more computing devices including, but not limited to, a digital computer, a processor (e.g. a microprocessor), and a memory. The detection unit 116 may further determine from the received output signal(s) the rotational speed of the propeller 30 as well as achieve synchrophasing and synchronization, e.g. in aircraft having multiple engines. Other applications will be readily understood by a person skilled in the art.

As shown in FIG. 4, in one embodiment, the position markers 102 comprise a plurality of spaced protrusions or teeth mounted (using any suitable attachment means, such as screws, bolts, and the like) to an inner face 118 of the feedback ring 104 or formed integrally with the feedback ring 104. A first set of teeth, illustratively at least two first teeth 102A and 102C, and at least one second tooth, which is referred to herein as a detection tooth 102B, are provided, with the detection tooth 102B being positioned between two consecutive ones of the first teeth 102A and 102C. In one embodiment, a total of three (3) teeth 102A, 102B, 102C, is provided about the perimeter of the feedback ring 104, as illustrated. It should however be understood that more than three (3) teeth may be provided. In particular, more than one detection tooth 102B may be provided for propeller phase detection (e.g. to implement missing tooth detection, as discussed further below) and to maintain operation of the system. The number of teeth in turn drives the size of the digital counters provided in the detection unit (as discussed further below).

Each first tooth 102A or 102C is illustratively positioned along a direction D, which is substantially parallel to the axis A. The detection tooth 102B is positioned along a direction E angled to the direction D, such that the tooth 102B is offset relative to the teeth 102A and 102C. A range of angles may be used to design the detection tooth 102B. The angle between directions E and D may be selected based on optimization of development test data and may include compound angles, e.g. angles comprising a first component providing a radial component and a second component providing a tangential component. Illustratively, the angle between directions E and D is between 0.1 and 89.9 degrees. In one preferred embodiment, the angle is set to 45 degrees so as to maximize the signal change (as detected by the sensor 112 in FIG. 2) for a given axial movement of the propeller (reference 30 in FIG. 3) resulting from the offset of tooth 102B relative to teeth 102A and 102C. Other embodiments may apply.

Figure 5A:
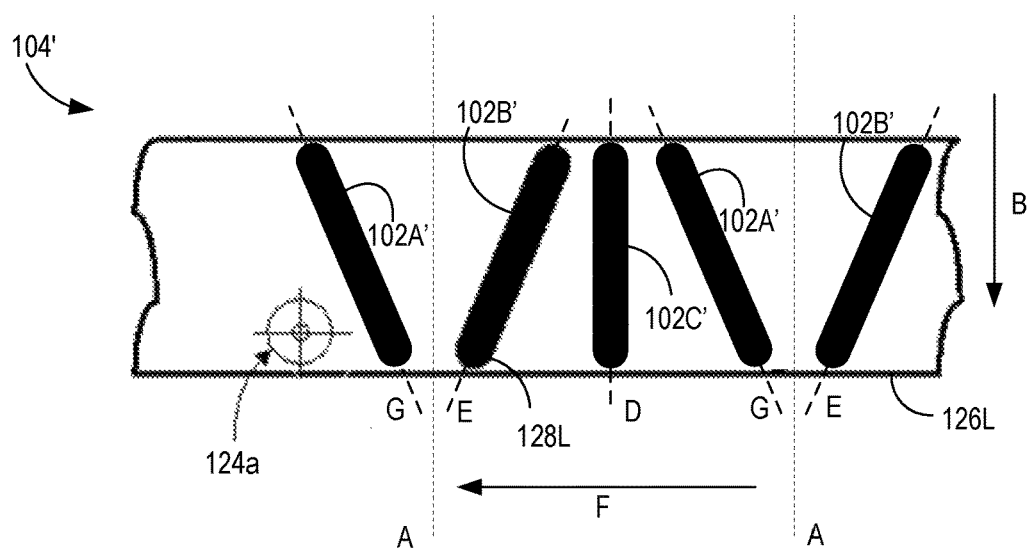
FIGS. 5A-5B illustrate a schematic view of an inner surface another feedback ring, and a schematic side view of the feedback ring, in accordance with an illustrative embodiment.
Figure 5B:
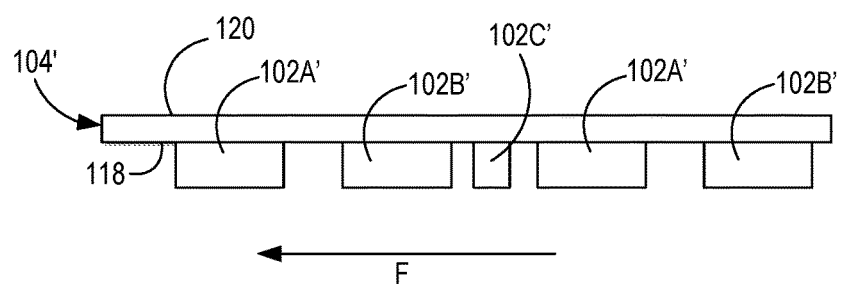

In some embodiments, teeth 102 may be provided in pairs. For example, FIGS. 5A-5B depict an example feedback ring 104' with a plurality of pairs of teeth 102A', 102B'. Each pair of teeth 102A', 102B' are angled relative to one another and to longitudinal axis A so as to diverge from one another and from axis A. As shown, teeth 102A', 102B' diverge in a rearward direction and converge in a forward direction. However, in other embodiments, this orientation may be reversed. Teeth 102A', 102B' may be angled to longitudinal axis A by the same angle, or by different angles. In an example, each of teeth 102A', 102B' is positioned approximately at a 45 degree angle to longitudinal axis A and teeth 102A', 102B' are positioned approximately at a 90 degree angle to one another.

Pairs of teeth 102A', 102B' are spaced at even intervals around the circumference of feedback ring 104. One or more discontinuities may be provided in the spacing pattern. For example, as shown in FIG. 5A, an extra tooth 102C' may be placed between a pair of teeth 102A', 102B'. In some embodiments, extra teeth 102C' may be provided between multiple pairs of teeth 102A', 102B', provided that a discontinuity exists in the pattern of tooth spacing around the circumference of feedback ring 104.

Figure 6A:
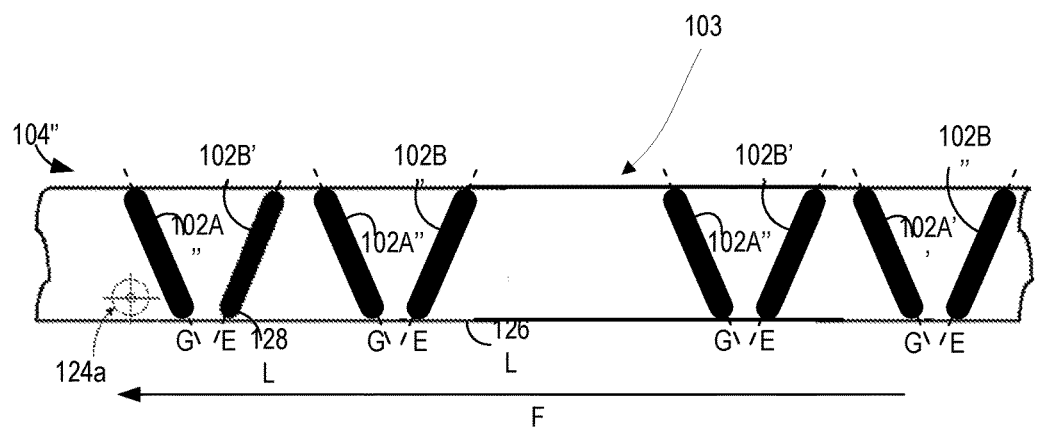
FIGS. 6A-6B illustrate a schematic view of an inner surface another feedback ring, and a schematic side view of the feedback ring, in accordance with an illustrative embodiment.
Figure 6B:
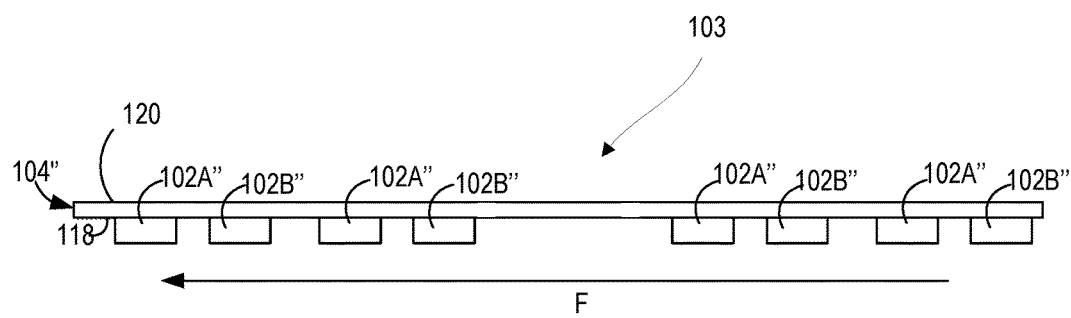

In some embodiments, a discontinuity may be provided in the form of a missing tooth or pair of teeth. For example, FIGS. 6A-6B depict a feedback ring 104" with diverging pairs of teeth 102A', 102B'. The pairs of teeth 102A', 102B' are evenly spaced, but a discontinuity is provided in the form of a gap 103 between pairs of teeth.

As illustrated in FIG. 2, each sensor 112 may be mounted to the flange 114 adjacent the inner face 118 of the feedback ring 104, i.e. inside the feedback ring 104. In an alternate embodiment, the teeth 102A, 102B, 102C may be mounted to (e.g. extend away from) an outer face 120 of the beta feedback ring 104 and each sensor 112 may accordingly be positioned adjacent the outer face 120, about a perimeter of the feedback ring 104. In yet another embodiment, the position markers may comprise slots (not shown) rather than teeth, with the slots being machined or otherwise formed in the feedback ring 104 and made of a magnetically conductive material, e.g. a ferrous metal. It should be understood that the number of position markers 102A, 102B, 102C of the beta feedback ring 104 may be adjusted according to the desired application. For instance, the number of position markers 102A, 102B, 102C may be increased to provide low speed detection frequency for the EEC.

Figure 4A:
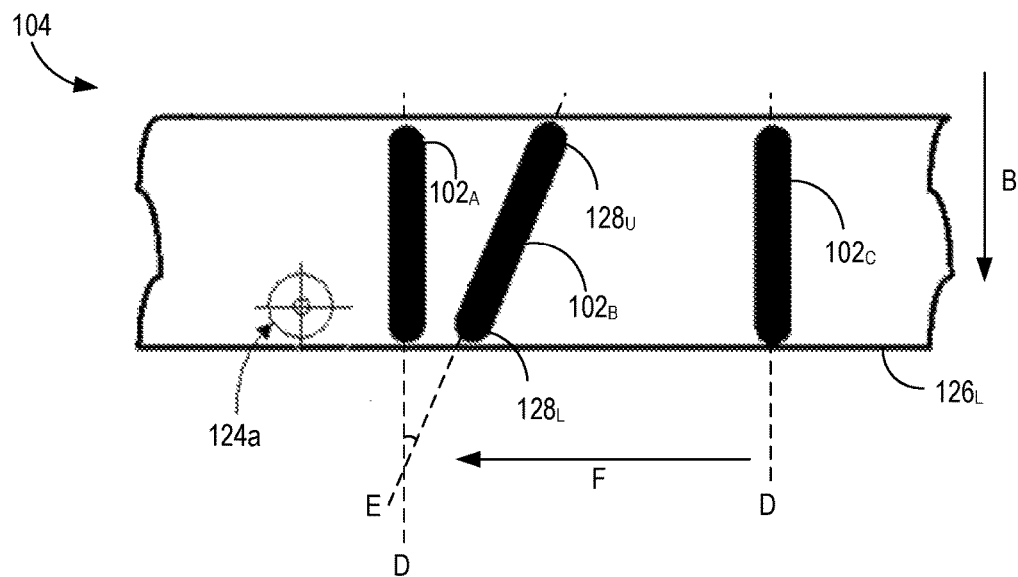
FIGS. 4A-4B illustrate a schematic view of an inner surface of the feedback ring of FIG. 2, and a schematic side view of the feedback ring, in accordance with an illustrative embodiment.
Figure 4B:
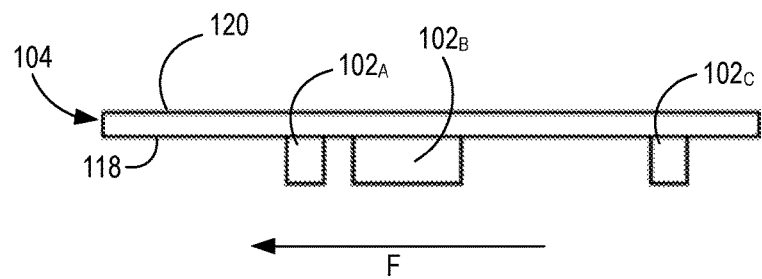
Figure 7A:
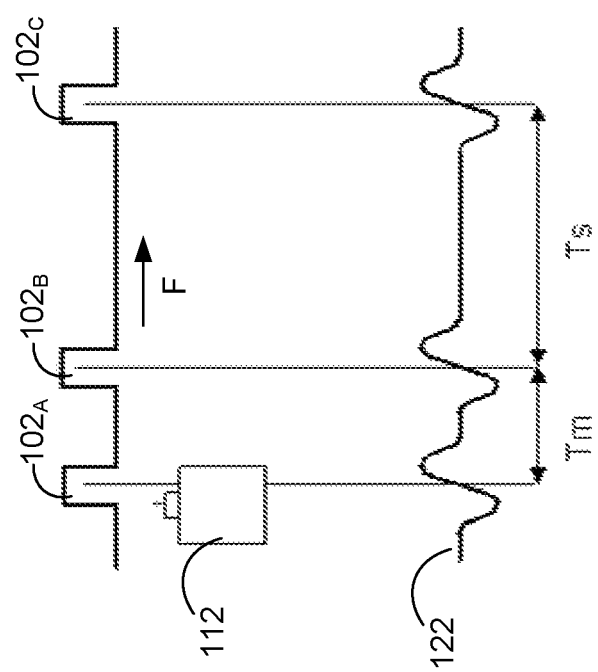
FIG. 7A-7C are schematic diagrams illustrating operation of a beta position transducer, with the feedback rings of FIGS. 4A-4B, FIGS. 5A-5B and FIGS. 6A-6B, respectively, in accordance with an illustrative embodiment.

Referring now to FIG. 7A in addition to FIGS. 4A-4B, in operation, the feedback ring 104 rotates (e.g. in the direction of arrow F) during rotation of the propeller (reference 30 in FIG. 3). The sensor 112 then detects the passage of each one of the position markers 102 and accordingly generates an output voltage signal (also referred to herein as a variable mark/space signal). FIG. 7A illustrates a waveform 122 generated by rotation of feedback ring 104. In particular, as the position markers 102 are displaced by movement of the propeller 30, each one of the position markers (e.g. position marker 102A) approaches the sensor 112. This changes the sensor's reluctance and causes a magnetic field to be generated and current to flow in the sensor's coil. An increase in the sensor's output voltage signal 122 (e.g. a single pulse causing a positive voltage transition) is then produced. When the given position marker (e.g. position marker 102A) moves away from the sensor 112, the pulse shape is inverted and the sensor's output voltage signal 122 is returned to zero. As will be apparent, the polarity of sensor 112 may be reversed, such that approach of a position marker 102 cases a negative voltage transition, followed by a positive voltage transition when the position marker 102 moves away from the sensor 112.

The sensor's output voltage signal 122 is received at the detection unit 116, which continuously monitors the signal to detect the positive transition of the voltage waveform. When such a positive transition is detected, the detection unit 116 accordingly determines that the increase in voltage corresponds to detection by the sensor 112 of passage of a position marker (e.g. position marker 102A). A digital counter (not shown), such as a free-running 20 MHz counter, provided in the detection unit 116 starts counting the number of digital clock cycles until the next position marker (e.g. position marker 102B) is detected by the sensor 112, i.e. until the next positive transition in the output voltage 122. In particular, the counter determines the number of clock cycles between detection of passage of the first teeth 102A, 102C and detection of passage of the detection tooth 102B of the modified beta feedback ring 104. The interval of time between the passage of the first tooth 102A and the passage of the detection tooth 102B is indicated as Tm while the interval of time between the passage of the detection tooth 102B and the passage of the first tooth 102C is indicated as Ts. The detected time intervals Tm and Ts are then stored in the memory for subsequent processing by the detection unit 116. As discussed above, the number of teeth 102A, 102B, 102C limits the size and/or number of counters within the detection unit 116. In some embodiments, the size and/or number of the digital counters may be increased to provide low speed detection frequency for the EEC, assuming a fixed digital timebase within the detection unit 116. It should be understood that slowing the fixed digital timebase may also achieve low speed detection frequency but penalizes system accuracy.

Figure 7B:
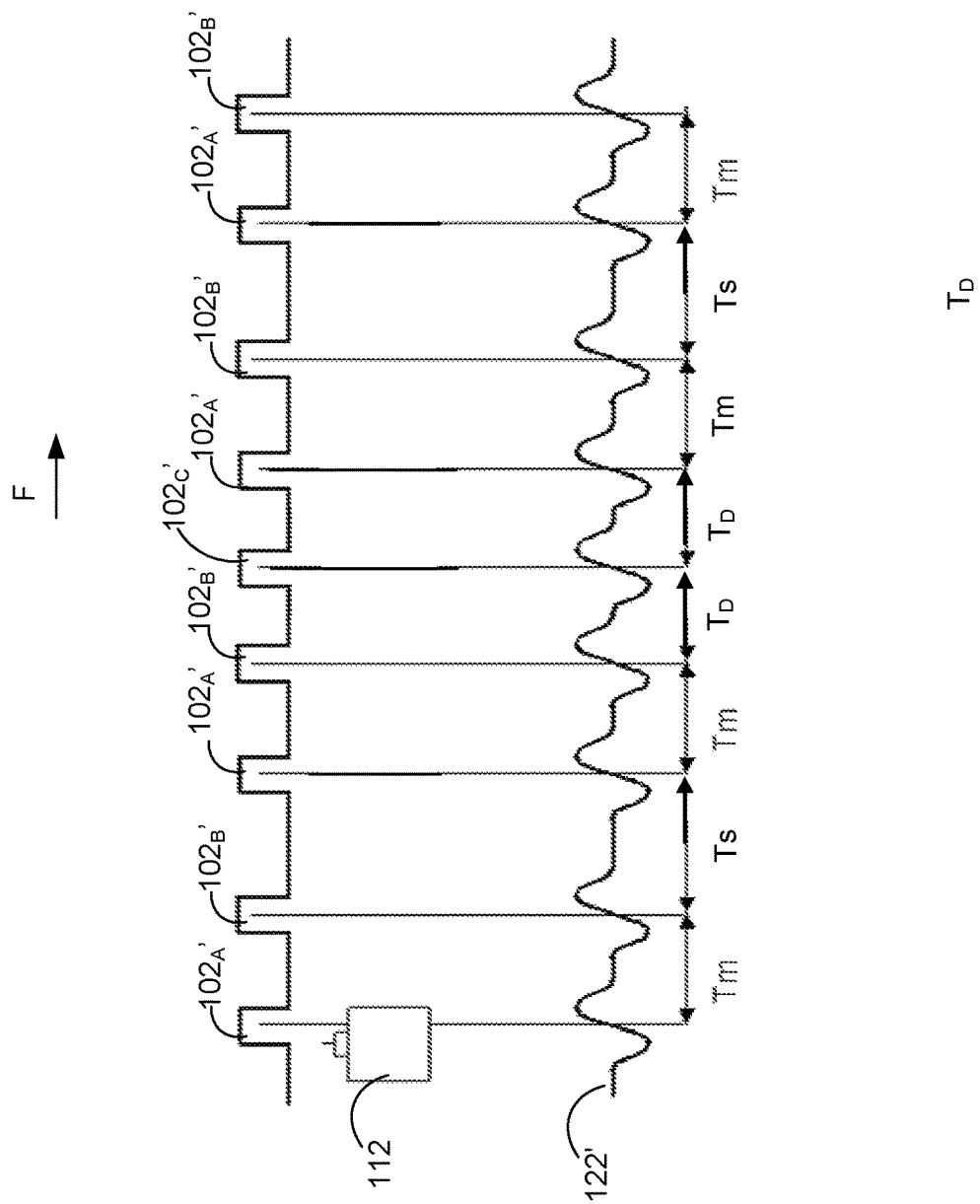

FIG. 7B illustrates a waveform 122' generated by rotation of feedback ring 104'. In particular, as the position markers 102' are displaced by movement of the propeller 30, each one of the position markers (e.g. position marker 102A') approaches the sensor 112 and causes an increase in the sensor's output voltage signal 122'. When the given position marker (e.g. position marker 102A) moves away from the sensor 112, the pulse shape is inverted and the sensor's output voltage signal 122' is returned to zero. The resulting signal has pairs of evenly-spaced peaks corresponding to pairs of evenly spaced teeth 102A', 102B'. Specifically, the pair of peaks associated with each pair of teeth 102A', 102B' are spaced apart by a time interval Tm. The interval between the second tooth of a pair, namely, tooth 102B', and the first tooth of the next pair, 102A', is a time interval Ts. As depicted, intervals Tm, Ts form a regular pattern, which is interrupted by peaks associated with discontinuities, namely teeth 102C'. Teeth 102C' are separated from the adjacent teeth 102A', 102B' by a time interval Td.

Figure 7C:
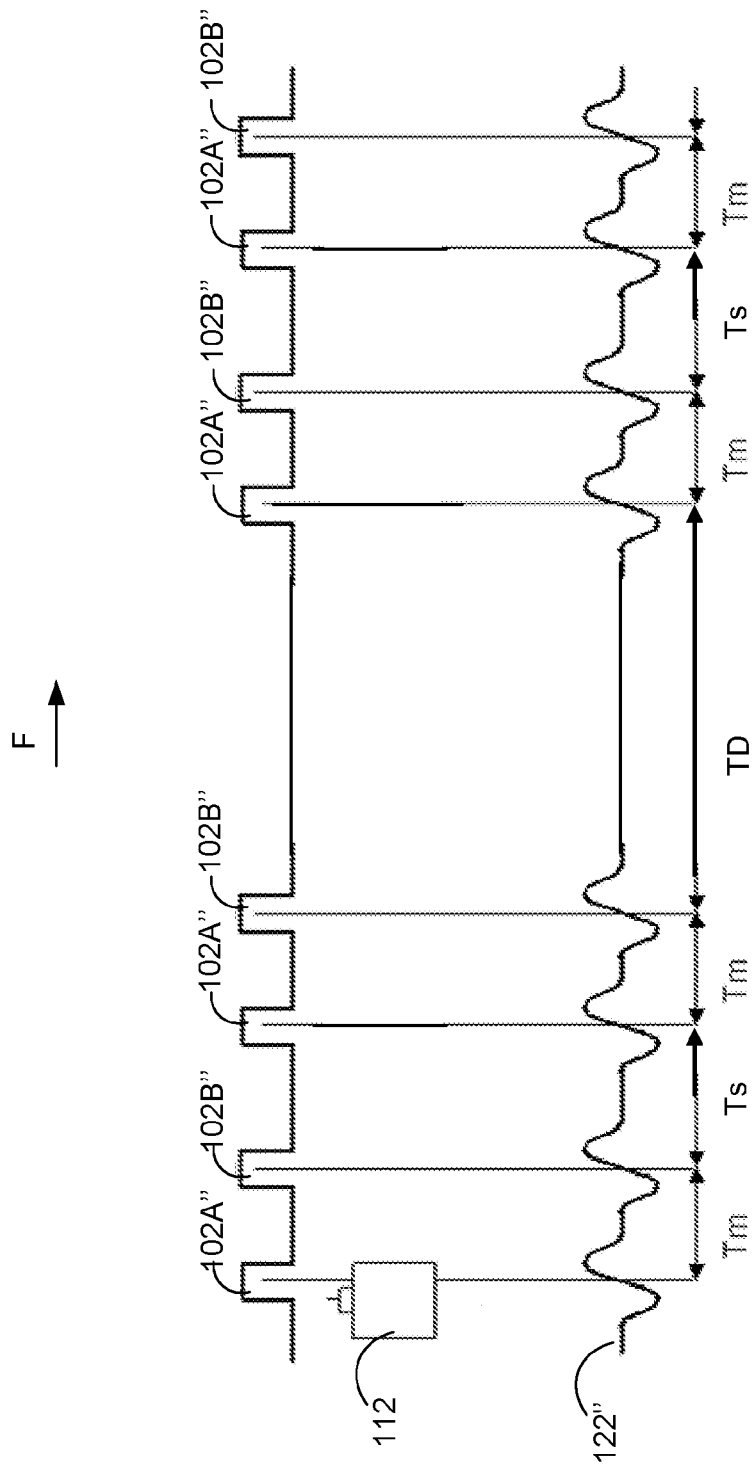

FIG. 7C illustrates a waveform 122" generated by rotation of feedback ring 104". Similar to waveform 122', waveform 122" has peaks corresponding to teeth 102A", 102B". Peaks associated with each pair of teeth 102A", 102B" are separated by a time interval Tm. Adjacent pairs of peaks are separated by a time interval Ts. That is, the time between tooth 102B" of one pair and tooth 102A" of the next pair is Ts. Intervals Tm, Ts alternate, forming a regular pattern that is interrupted by discontinuities, namely gap 103. Specifically, gap 103 defines a relatively large distance between a tooth 102B" and the next tooth 102A", with a corresponding time interval Td larger than either Tm or Ts.

Figure 8A:
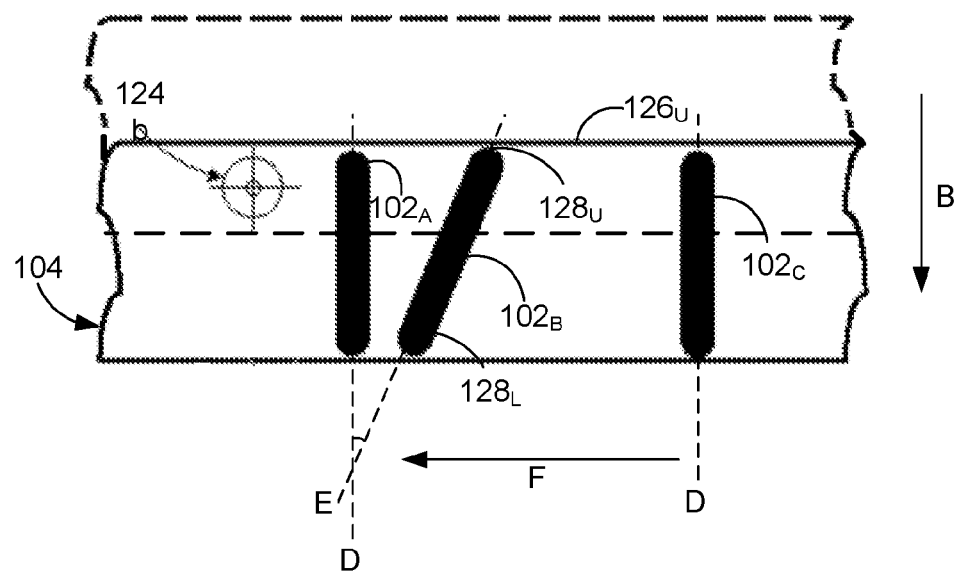
FIGS. 8A-8B illustrate the arrangements of FIGS. 4A-4B and FIGS. 5A-5B with the propeller in a fully reverse position, in accordance with an illustrative embodiment.
Figure 8B:
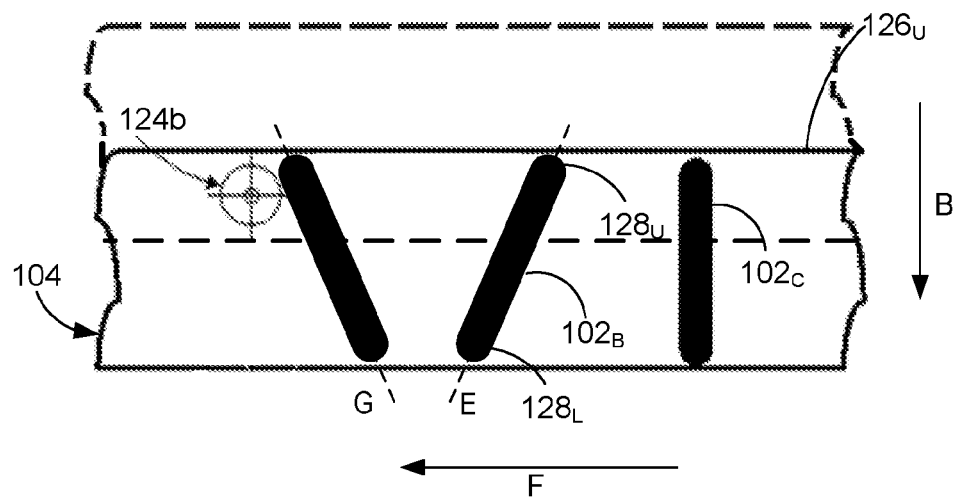

Referring now to FIGS. 8A-8B, the angled or offset positioning of teeth 102, 102', 102" results in the sensor 112 seeing different portions of the teeth as the propeller mode of operation is modified and the blade angle is varied. Indeed, in one embodiment, the propeller 30 is a reversing (or reverse-pitch) propeller which may be operated in reverse-pitch mode for ground reversing or taxis operation. As a result, the propeller blades (reference 110 in FIG. 3) may be moved toward reverse pitch, as discussed above, and a negative blade angle can be allowed to produce a reducing thrust in the aircraft. As the blade angle decreases, the feedback ring 104 then begins moving axially forward (in the direction of arrow B in FIG. 3) at the low blade angle setting. Forward movement continues until reaching reverse pitch stop. At blade angles significantly higher than the low blade angle setting, the feedback ring 104 remains stationary.

During axial displacement of the feedback ring 104, 104', 104", the sensor 112 is successively exposed to different sections of the position markers 102, 102', 102" the different sections being taken along the direction E. As illustrated in FIGS. 4-6, the sensor 112 is in a first position 124a relative to the feedback ring 104, 104', 104" prior to the propeller entering the reverse mode of operation (e.g. before the feedback ring 104, 104', 104" begins axial movement). In this position 124a, the sensor 112 is adjacent a lower edge 126L of the feedback ring 104, 104', 104" is exposed to and can accordingly detect the passage of the lower end portions 128L of the angled teeth 102, 102', 102". As the propeller 30 enters the reverse mode of operation and the blade angle is decreased, the feedback ring 104, 104', 104" is gradually displaced along axis A in the direction of arrow B. When the propeller is in the full reverse condition, the feedback ring 104, 104', 104" has been fully axially displaced and reaches the position illustrated in solid lines in FIGS. 8A-8B (with the original position of the feedback ring 104, 104', 104" being shown in dashed lines). As a result, the sensor 112 is in a second position 124b relative to the displaced feedback ring 104, 104', 104". In this position 124b, the sensor 112 is adjacent to an upper edge 126U of the feedback ring 104, 104', 104" such that the sensor 112 is exposed to and can accordingly detect the passage of the upper end portion 128U of the angled teeth 102, 102', 102".

As can be seen from FIGS. 8A-8B, due to the angled and converging configuration of teeth 102, 102', 102", the circumferential distance between teeth decreases in direction B such that the lower end portions 128L are positioned closer to one another than the upper end portion 128U. As such, when the feedback ring 104, 104', 104" is in the initial position with the sensor 112 in position 124a relative to the feedback ring 104, 104', 104", the sensor 112 detects the passing of the tooth 102B (e.g. the lower end 128L thereof) earlier (i.e. in less time) than when the feedback ring 104 is fully displaced with the sensor 112 in position 124b relative to the feedback ring 104, 104', 104" and the sensor 112 detects the passing of a tooth 102, 102', 102" (e.g. the upper end 128U thereof). As a result, the time taken by the sensor 112 to detect the passing of the tooth 102B varies as the feedback ring 104, 104', 104" is displaced axially in the direction of arrow B.

Therefore, as can be seen in FIG. 7A, the timeframes Tm and Ts are varied as the feedback ring 104 moves axially along the propeller system and the position of the sensor 112 relative to the feedback ring 104 varies. In particular and as discussed above, as the direction of rotation (arrow F in FIG. 4) increases, the section or area of the tooth 102B observed by the sensor 112 is gradually displaced along the direction E of FIG. 4 and more rearward (relative to direction of arrow F) tooth sections are observed until the most rearward section, e.g. the upper end 128U, is detected. Accordingly, the area of the tooth 102B observed by the sensor 112 is gradually moved rearward (as illustrated by arrow G), i.e. from the lower (and most forward) end 128L being detected at first to the upper (and most rearward) end 128U being detected at last, and tooth sections in between being successively detected by the sensor 112. Therefore, the time interval Tm is increased and the time interval Ts decreased. This in turn alters the spacing relationship between Tm (timeframe between detection by sensor 112 of teeth 102A and 102B) and Ts (timeframe between detection by sensor 112 of teeth 102B and 102C).

The relationship between the beta angle, the longitudinal position of feedback ring 104 and the measured values of Tm and Ts is then given by:

$$\text{Beta angle} = \text{function(feedback ring position)} = \text{function}[(Ts-Tm)/(Ts+Tm)] \quad (1)$$

The expression (Ts−Tm)/(Ts+Tm) is also referred to as the mark-to-space ratio. The mark-to-space ratio is related to the feedback ring position by a function that is a characteristic of the ring and tooth geometry. The longitudinal position of the feedback ring is related to the propeller beta angle by a function specific to the propeller 30.

The detection unit 116 can then apply equation (1) to compute the axial position of feedback ring 104 and thus, the propeller system. Based on this position, the detection unit 116 can compute the corresponding blade angle for the propeller (reference 30 in FIG. 3). The detection unit 116 can further detect axial movement of the feedback ring 104 by detecting a change in the spatial relationship between Ts and Tm. This could be done by comparing current values of Ts and Tm to previous values stored in memory and detecting the change in spatial relationship upon detecting a difference in the values.

Timeframes Tm and Ts likewise vary as feedback rings 104', 104" move axially along the propeller system and the position of the sensor 112 relative to the feedback ring 104', 104" varies. In particular, as the feedback ring 104', 104" moves forwardly relative to sensor 112, more rearward tooth sections are observed until the most rearward section, e.g. the upper end 128U, is detected. The time interval Tm is increased and the time interval Ts decreased. This in turn alters the spacing relationship between Tm and Ts.

As noted, teeth 102A', 102B', 102A", 102B" of feedback rings 104' 104" are positioned at an angle to longitudinal axis A such that they diverge from one another and from axis A. Conversely, on feedback ring 104, only teeth 102B are angled to longitudinal axis A. Accordingly, the ratio of longitudinal movement to change in timeframe Tm is larger for feedback rings 104', 104" than for feedback ring 104, assuming that the orientations of teeth 102B, 102B', 102B" are the same. This may allow feedback rings 104' 104" to provide higher-resolution feedback than feedback ring 104. That is, feedback rings with pairs of teeth that diverge from one another and the longitudinal axis A may be capable of measuring beta angle in finer gradations than feedback ring 104.

In some cases, geometry of feedback rings 104', 104" and teeth 102', 102" may be such that the possible ranges of intervals Ts and Tm overlap. That is, a particular longitudinal position of feedback ring 104', 104" may result in an interval Ts of the same length as an interval Tm for a different position of feedback ring 104', 104". Thus, the lengths of intervals Tm, Ts may not be sufficient to allow detection unit 116 to differentiate between intervals Tm, Ts. For example, detection unit 116 may detect an alternating pattern of long and short intervals. However, without further information, it may be ambiguous whether the long or the short intervals correspond to Tm and therefore are indicative of longitudinal position. The pattern may be associated with two candidate longitudinal positions, one if the short intervals are intervals Tm, and the other if the long intervals are intervals Tm.

Discontinuities such as teeth 102C' and gap 103, and the associated time intervals Td may be used to ascertain which detected interval is Tm. Specifically, discontinuities may be configured such that intervals Td associated with the discontinuities are longer than the range of the maximum possible values of Tm and Ts or shorter than the minimum possible values of Tm and Ts, i.e, so that interval Td is outside the possible range of values of Tm and Ts. Such intervals will occur when the spacing of teeth defining interval Td is greater than the maximum spacing of teeth defining intervals Tm, Ts, or less than the minimum spacing of teeth defining intervals Tm, Ts. In such cases, intervals Td may be identified based only on length.

Discontinuities may also provide an indication of revolutions of the propeller. For example, if feedback ring 104 has one discontinuity around its circumference, each occurrence of interval Td is indicative of a complete revolution of the propeller. Similarly, if feedback ring 104 has two discontinuities around its circumference, one revolution of the propeller corresponds to two occurrences of interval Td. Thus, the frequency at which discontinuities are detected is also indicative of the rotational speed of the propeller.

Figure 5C:
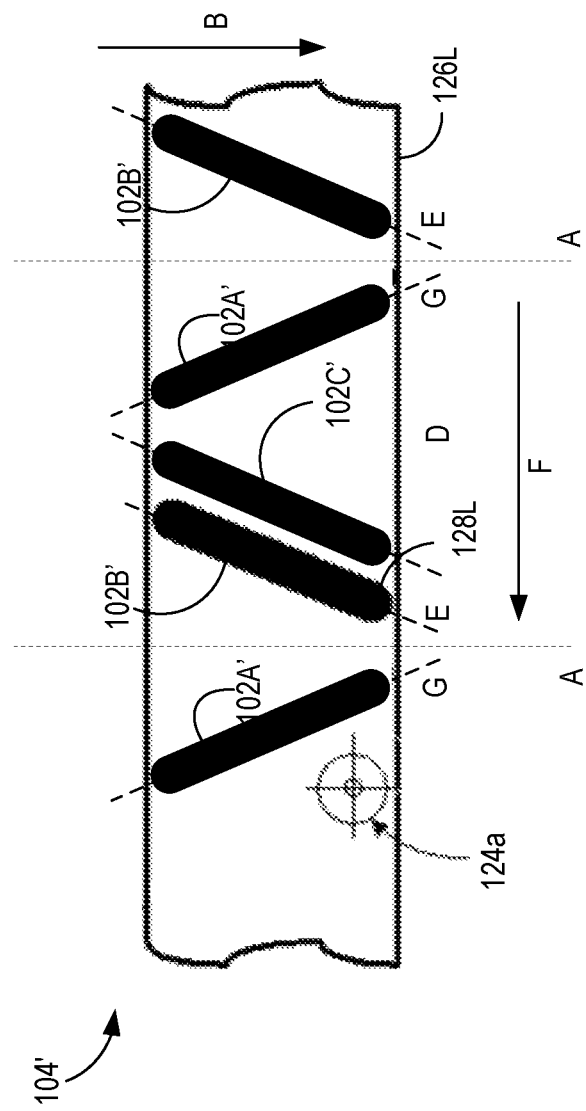
FIG. 5C illustrates a schematic view of an inner surface of another feedback ring.

In FIGS. 5A-5B, tooth 102C' is oriented parallel to longitudinal axis A. However, tooth 102C' may have other orientations. For example, FIG. 5C depicts a bottom view of a feedback ring 104' with a tooth 102C' oriented parallel to a tooth 102B'.

The orientation of each tooth as it passes sensor 112 may affect characteristics of the sensor signal generated by the tooth. For example, the slope of the output voltage curve proximate a peak may vary in dependence on the orientation of the tooth, specifically, its orientation relative to its direction of travel (the circumferential direction F). A tooth oriented perpendicularly to its direction of travel (corresponding to the orientation of longitudinal axis A) may generate a curve with a steeper slope than would be generated by a tooth oriented at an angle to its direction of travel.

With reference to FIGS. 6A-6B and 7C, gap 103 is known to be positioned between two teeth 102A". Accordingly, interval Td is known to occur between two instances of Tm. If the detected pattern is as depicted in FIG. 7C, i.e. short-long-short-Td-short-long-short, detection unit 116 determines that the "short" interval is Tm and computes beta angle based on that interval.

In addition to beta position, the detection unit 116 can electronically decode the sensor's output voltage signal to provide the propeller's rotational speed. Indeed, the rotational speed can be computed on the basis of the sum of the timeframe values (Tm+Ts) and the number of position markers 102A, 102B, 102C, using known computation methods. Propeller synchrophasing and synchronization for multi-engine (e.g. twin engine) aircrafts and other applications may further be implemented by removing one or more of the position markers 102A, 102B, 102C from the beta feedback ring 104 to permit missing tooth pulse detection capability in the engine control electronics. It should be understood that either one of the position markers 102, i.e. one of the first teeth 102A, 102B or one angled teeth 102B, may be removed from the feedback ring 104 to perform missing tooth detection. In particular, the angled tooth 102B may be removed such that a gap is created between successive first teeth 102A. Detection of the missing tooth may then provide a special timing position signal. When several engines are provided in the aircraft, the timing position signal can then be used to keep the engines operating at the same revolutions per minute (RPM) and the propeller blades in phase with one another. As a result of such synchrophasing and synchronizing, noise and vibration can be reduced.

Figure 9:
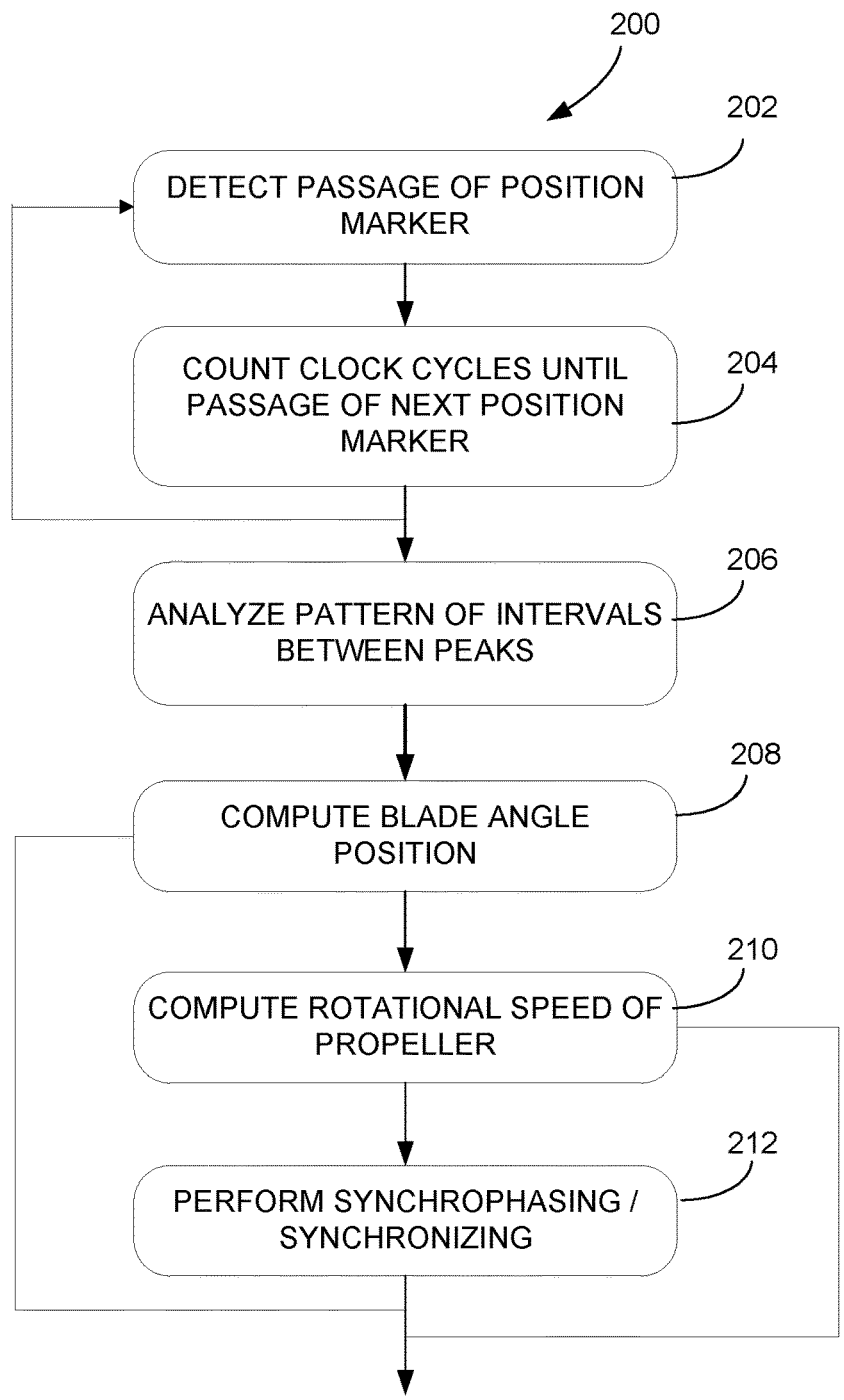
FIG. 9 is a flowchart of a method for electronic beta feedback detection, in accordance with an illustrative embodiment.

FIG. 9 illustrates a method 200 for electronic beta feedback. The method 200 comprises detecting the passage of a first position marker at block 202. The next block 204 is then to count the clock cycles until the passage of the next position marker is detected. Detection may be performed using a suitable sensor, such as a sensor 112 arranged on a beta feedback ring as discussed herein above with reference to FIG. 2, with the non-offset and offset position markers arranged as discussed herein above. At block 206, detection unit 116 analyzes the pattern of intervals between peaks to determine which interval corresponds to the spacing of a pair of teeth. Analysis of the pattern of peaks may include identifying a discontinuity interval (e.g. based on its duration) and identifying the interval associated with spacing between first and second teeth of a pair based on proximity to the discontinuity. In an example, the interval adjacent to the discontinuity interval is associated with spacing between teeth of a pair. At block 208, detection unit 116 may compute the blade angle position on the basis of the counted clock cycles, e.g. by applying equation (1) discussed herein above. As discussed above, the rotation speed of the propeller may also be computed at block 210 using knowledge of the counted clock cycles and the number of position markers and propeller synchrophasing and synchronization may also be performed at block 212 by applying missing tooth detection.

FIG. 10 shows a schematic representation of the EEC 115, as a combination of software and hardware components in a computing device 600. The computing device 600 may comprise one or more processing units 602 and one or more computer-readable memories 604 storing machine-readable instructions 606 executable by the processing unit 602 and configured to cause the processing unit 602 to generate one or more outputs based on one or more inputs. The inputs may comprise one or more signals representative of the requested gas generator speed, the shaft inertia value, and the steady state fuel flow rate. The outputs 610 may comprise one or more signals representative of the feedforward fuel flow rate and the final fuel flow rate.

Processing unit 602 may comprise any suitable devices configured to cause a series of steps to be performed by computing device 600 so as to implement a computer-implemented process such that instructions 606, when executed by computing device 600 or other programmable apparatus, may cause the functions/acts specified in method 200 to be executed. Processing unit 602 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 604 may comprise any suitable known or other machine-readable storage medium. Memory 604 may comprise non-transitory computer readable storage medium such as, for example, but not limited to, an electronic, magnetic, optical, electromagnetic, infrared, or semiconductor system, apparatus, or device, or any suitable combination of the foregoing. Memory 604 may include a suitable combination of any type of computer memory that is located either internally or externally to computing device 600 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g. devices) suitable for retrievably storing machine-readable instructions 606 executable by processing unit 602.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 604) having computer readable program code (e.g., instructions 606) embodied thereon. The computer program product may, for example, be executed by a computer to cause the execution of one or more methods disclosed herein in entirety or in part.

Computer program code for carrying out operations for aspects of the present disclosure in accordance with instructions 606 may be written in any combination of one or more programming languages, including an object oriented programming language such as Java, Smalltalk, C++ or the like and conventional procedural programming languages, such as the "C" programming language or other programming languages. Such program code may be executed entirely or in part by a computer or other data processing device(s). It is understood that, based on the present disclosure, one skilled in the relevant arts could readily write computer program code for implementing the methods disclosed herein.

The above description is meant to be exemplary only, and one skilled in the art will recognize that changes may be made to the embodiments described without departing from the scope of the invention disclosed. For example, the annular member may be any construction, shape and configuration suitable to provide the functionality described herein and, for example, need not be annular per se. The annular member may be stationary and the sensor may rotate. In another example, the sensor and annular member may be operative in connection with another suitable rotating component of the engine indicative of propeller rotation. Relative axial movement between sensor(s) and the annular member may be accomplished in any suitable fashion. Still other modifications which fall within the scope of the present invention will be apparent to those skilled in the art, in light of a review of this disclosure, and such modifications are intended to fall within the appended claims.

What is claimed is:

1. A blade angle position feedback system for an aircraft propeller, the propeller rotatable about a longitudinal axis and comprising a plurality of blades each rotatable through a range of blade angles, the system comprising:

a feedback device comprising at least one pair of position markers spaced from one another around a circumference of said feedback device and oriented at ac first angle relative to one another and at a same second angle relative to said longitudinal axis;

at least one sensor mounted adjacent the feedback device, the at least one sensor configured for successively detecting passage of said position markers and generating a sensor signal indicative of passage of said position markers, the feedback device and the at least one sensor configured for relative axial displacement between a first relative axial position and a second relative axial position, the first axial position corresponding to a first mode of operation and the second axial position corresponding to a second mode of operation, one of the feedback device and the at least one sensor rotationally coupled to the propeller for rotation relative to the other of the feedback device and the at least one sensor; and a detection unit connected to the at least one sensor for receiving the sensor signal therefrom, determining on the basis of the sensor signal a time interval elapsed between passage of the position markers, and computing from the time interval a blade angle position for the plurality of blades.

2. The system of claim 1, wherein said feedback device comprises an annular member.

3. The system of claim 2, wherein the at least one pair of position markers comprises a plurality of pairs of position markers defining a regular pattern around a circumference of said annular member, said annular member further comprising a discontinuity in said pattern.

4. The system of claim 3, wherein said discontinuity comprises an extra position marker.

5. The system of claim 4, wherein said extra position marker is oriented parallel to said longitudinal axis.

6. The system of claim 3, wherein said discontinuity comprises a gap between position markers.

7. The system of claim 3, wherein said discontinuity defines a discontinuity time interval that is larger than a range of possible values of said time interval or smaller than a range of possible values of said time interval.

8. The system of claim 4, wherein the detection unit is configured to measure a first time interval Tm between the passage of a first one of the position markers and the passage of a second one of the position markers, and to measure a second time interval Ts between the passage of adjacent pairs of position markers and computing the blade angle position based on said time intervals Tm and Ts.

9. The system of claim 8, wherein said controller is configured to measure a discontinuity interval Td associated with said discontinuity, and to identify a measured interval as interval Tm based on adjacency to said interval Td.

10. The system of claim 2, wherein said pattern has a single discontinuity around the circumference of said feedback device.

11. The system of claim 1, wherein said feedback device is rotationally coupled to the propeller.

12. An aircraft propeller system comprising:
a propeller rotatable about a longitudinal axis and having a plurality of blades each rotatable through a range of blade angles;
a feedback device comprising at least one pair of position markers spaced from one another around a circumference of said feedback device and oriented at ac first angle relative to one another and at a same second angle relative to said longitudinal axis;
a sensor adjacent the feedback device and configured for detecting said position markers passing the sensor and for generating a sensor signal indicative of passage of said position markers, the feedback device and sensor movably mounted with respect to one another, one of the feedback device and sensor mounted for rotation with the propeller and the other fixedly mounted; and
a detection unit connected to the sensor and configured for determining on the basis of said sensor signal a time interval between passage of the position markers and computing a blade angle position based on said time interval.

13. The system of claim 12, wherein said at least one pair of position markers defines a regular pattern around a circumference of said feedback device, said feedback device further comprising a discontinuity in said pattern.

14. The system of claim 12, wherein said feedback device is rotationally coupled to the propeller.

15. A method for blade angle position feedback for an aircraft propeller, the propeller rotatable about a longitudinal axis and comprising a plurality of blades each rotatable through a range of blade angles, the method comprising:
receiving a sensor signal from at least one sensor mounted adjacent to a feedback device, one of said at least one sensor and said feedback device operatively connected to rotate with the propeller, the feedback device comprising at least one pair position markers spaced apart around a circumference thereof and oriented at a first angle relative to one another and at a same second angle relative to said longitudinal axis, the at least one sensor configured for successively detecting a passage of each one of the at least one pair of position markers and for generating a sensor signal indicative of passage of said position markers, the feedback device and the at least one sensor configured for relative axial displacement;
determining on the basis of the sensor signal a time interval elapsed between the passage of a first position marker and a second position marker of said at least one pair; and
computing from the time interval a blade angle position for the plurality of blades.

16. The method of claim 15, further comprising detecting a signal discontinuity in said sensor signal associated with a pattern discontinuity in a pattern of said position markers on said feedback device.

17. The method of claim 16, wherein said time interval is determined based on adjacency to said discontinuity in said sensor signal.

18. The method of claim 16, wherein said detecting a discontinuity comprises detecting a discontinuity time interval longer than a maximum possible time interval between passage of said first position marker and said second position marker of said at least one pair or shorter than a minimum possible time interval between passage of said first position marker and said second position marker of said at least one pair.

* * * * *